United States Patent
Yu (10) Patent No.: US 9,535,535 B2
(45) Date of Patent: Jan. 3, 2017

(54) TOUCH POINT SENSING METHOD AND OPTICAL TOUCH SYSTEM

(71) Applicant: Wistron Corporation, New Taipei (TW)

(72) Inventor: Chan-Hsuan Yu, New Taipei (TW)

(73) Assignee: Wistron Corporation, New Taipei (TW)

( * ) Notice: Subject to any disclaimer, the term of this patent is extended or adjusted under 35 U.S.C. 154(b) by 121 days.

(21) Appl. No.: 14/662,250

(22) Filed: Mar. 19, 2015

(65) Prior Publication Data

US 2016/0162115 A1    Jun. 9, 2016

(30) Foreign Application Priority Data

Dec. 3, 2014   (TW) .............................. 103141965 A (51) Int. Cl.
   *G06F 3/041*    (2006.01)
   *G06F 3/042*    (2006.01)

(52) U.S. Cl.
   CPC ........... *G06F 3/0418* (2013.01); *G06F 3/0421* (2013.01)

(58) Field of Classification Search
   None
   See application file for complete search history.

(56) References Cited

U.S. PATENT DOCUMENTS

| | | | | |
|---|---|---|---|---|
| 9,235,293 | B2* | 1/2016 | Chang | G06F 3/0416 |
| 2011/0018805 | A1* | 1/2011 | Liao | G06F 3/0428 |
| | | | | 345/158 |
| 2014/0267173 | A1* | 9/2014 | Liu | G06F 3/0421 |
| | | | | 345/175 |
| 2014/0320457 | A1* | 10/2014 | Chen | G06F 3/0416 |
| | | | | 345/175 |
| 2015/0049063 | A1* | 2/2015 | Smith | G06F 3/0421 |
| | | | | 345/175 |
| 2015/0070558 | A1* | 3/2015 | Okamori | H04N 5/23293 |
| | | | | 348/333.1 |

* cited by examiner

*Primary Examiner* — Antonio Xavier
(74) *Attorney, Agent, or Firm* — Jianq Chyun IP Office (57) ABSTRACT

A touch point sensing method and an optical touch system are provided. The optical touch system includes a first lens and a second lens. The touch point sensing method includes the following steps. Images including at least two touch objects in a touch detecting area captured by the first lens and the second lens are obtained and analyzed. Based on the obtained images, distance values between the first touch signal group at the first instant and the first and second touch signal groups at the second instant are calculated for determining whether the first and second touch signal groups at the second instant are overlapped. When the first and the second touch signal groups at the second instant are overlapped, locations of the touch signals in the first touch signal groups and in the second touch signal groups are exchanged.

12 Claims, 5 Drawing Sheets

TOUCH POINT SENSING METHOD AND OPTICAL TOUCH SYSTEM

CROSS-REFERENCE TO RELATED APPLICATION

This application claims the priority benefit of Taiwan application serial no. 103141965, filed on Dec. 3, 2014. The entirety of the above-mentioned patent application is hereby incorporated by reference herein and made a part of this specification.

BACKGROUND OF THE INVENTION

1. Field of the Invention

The invention relates to an optical touch technology, and particularly relates to a touch point sensing method and an optical touch system.

2. Description of Related Art

In the optical touch technology, the light reflective characteristic of the screen frame is utilized. Light is emitted onto the frame and reflected, and the optical sensors at the left and right sides are used to capture the images in an optical detecting region. If there is a touch object in the detecting region, light reflected from the frame is blocked. Therefore, there is a shadow in the image captured by the optical sensor, and the touch position is thus calculated based on the position of the shadow. More specifically, the touch position is determined by an original image waveform when there is no touch object detected in the detecting region and a current image waveform detected by the optical sensor. If the current image waveform and the original image waveform are the same, it is determined that there is no touch object. If there is a difference between the current image waveform and the original image waveform, it is determined that there is a touch object.

When there is only one touch object, each of the two sensors detects one shadow. Based on the position of the shadow, the position of the touch object can be correctly calculated. However, when there are two touch objects, since each of the sensors detects two shadows, and four points are derived based on the two shadows respectively detected by each of the two sensors. Two of the four points are correct touch points (i.e., real points), and the other two points are invalid touch points (i.e., ghost points), and the ghost points need to be eliminated. However, under some circumstances (e.g., the real points and ghost points are overlapped and an extending line of the real and ghost points passes through the optical sensor), the optical sensor may misjudge the ghost point as a real point and thus calculate the touch position incorrectly.

SUMMARY OF THE INVENTION

The invention provides a touch point sensing method and an optical touch system. The optical touch system is capable of identifying correct touch points under a circumstance that the touch points is overlapped with ghost points.

The invention provides a touch point sensing method adapted to an optical touch system having a first lens and a second lens. The touch point sensing method includes steps as follows: obtaining and analyzing images of at least two touch objects in a touch detecting area of the optical touch system captured by the first lens and the second lens; calculating a first touch signal group and a second touch signal group at a first instant and a second instant according to the images, wherein each of the first touch signal group and the second touch signal group includes locations of two touch signals; calculating a plurality of distance values between the touch signals in the first touch signal group at the first instant and the touch signals in the first touch signal group and the second touch signal group at the second instant, and determining whether the first touch signal group and the second touch signal group are overlapped at the second instant based on the distance values; and when the first touch signal group and the second touch signal group are overlapped at the second instant, exchanging the locations of the touch signals in the first touch signal group and the second touch signal group.

According to an embodiment of the invention, the touch point sensing method further includes steps as follows: calculating a first sum of distances of the distance values between the touch signals in the first touch signal group at the first instant and the touch signals in the first touch signal group at the second instant; calculating a second sum of distances of the distance values between the touch signals in the first touch signal group at the first instant and the touch signals in the second touch signal group at the second instant; when a ratio value between a sum of the first and second sums of distances and a smaller one of the first and second sums of distances is within a predetermined range, determining that the first touch signal group is overlapped with the second touch signal group.

According to an embodiment of the invention, the touch point sensing method further includes steps as follows: calculating a first minimum distance value of the distance values between combinations of the distance values between the touch signals in the first touch signal group at the first instant and the touch signals in the first touch signal group at the second instant; calculating a second minimum distance value of the distance values between combinations of the distance values between the touch signals in the first touch signal group at the first instant and the touch signals in the second touch signal group at the second instant; when a ratio value between a sum of distances of the first minimum distance value and the second minimum distance value and a smaller one of the first minimum distance value and the second minimum distance value is within a predetermined range, determining that the first touch signal group is overlapped with the second touch signal group.

According to an embodiment of the invention, the touch point sensing method further includes steps as follows: when a ratio value between the distance values calculated at the first instant and the second instant is less than the ratio value between the distance values calculated at the second instant and a third instant, determining that the first touch signal group is overlapped with the second touch signal group, wherein the first instant is prior to the second instant, and the second instant is prior to the third instant.

According to an embodiment of the invention, the touch point sensing method further includes steps as follows: when the first touch signal group and the second touch signal group are not overlapped at the second instant, not exchanging the locations of the touch signals in the first touch signal group and the second touch signal group.

The invention provides an optical touch system including a touch detecting area, a first lens, a second lens, and a control unit. The first lens and the second lens are configured to capture images of at least two touch objects in the touch detecting area.

The control unit is coupled to the first lens and the second lens, configured to obtain and analyze the images of the at least two touch objects in the touch detecting area captured by the first lens and the second lens, and calculates a first touch signal group and a second touch signal group at a first instant and a second instant. Each of the first touch signal group and the second touch signal group includes locations of two touch signals. A plurality of distance values between the touch signals in the first touch signal group at the first instant and the touch signals in the first touch signal group and the second touch signal group at the second instant are calculated. Whether the first touch signal group and the second touch signal group are overlapped at the second instant is determined based on the distance values. The locations of the touch signals in the first touch signal group and the second touch signal group are exchanged when the first touch signal group and the second touch signal group are overlapped at the second instant.

According to an embodiment of the invention, the first lens and the second lens are disposed at the same side of the touch detecting area and toward another side of the touch detecting area.

Other details about the embodiments of the optical touch system are already described above. Thus, details in this respect are not reiterated below.

In view of the foregoing, in the optical touch system and the touch point sensing method thereof according to the invention, the touch signals obtained by the optical sensing system sensing the two touch objects are categorized into the first and second touch signal groups. In addition, whether the first and the second touch signal groups are overlapped at the second instant is determined by calculating the distance values between the first touch signal group at the first instant and the first and second touch signal groups at the second instant. When it is determined that the touch signal groups are overlapped, the first and second touch signal groups at the second instant are exchanged, thereby correctly identify positions of the touch points and avoid misjudging the ghost point as a real point.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

In an optical touch system, locations of a plurality of touch objects in a touch detecting area tend to influence judgments of the optical touch system on touch positions. In the invention, the optical touch system analyzes captured images to obtain two touch signal groups when at least two touch objects are sensed. By calculating distance values between the two touch signal groups at different instants, whether the two touch signal groups are overlapped is determined to know whether the locations of the touch objects in the touch detecting area are exchanged and exchange data of the two touch signal groups accordingly, thereby reflecting actual locations of touch points.

Figure 1:
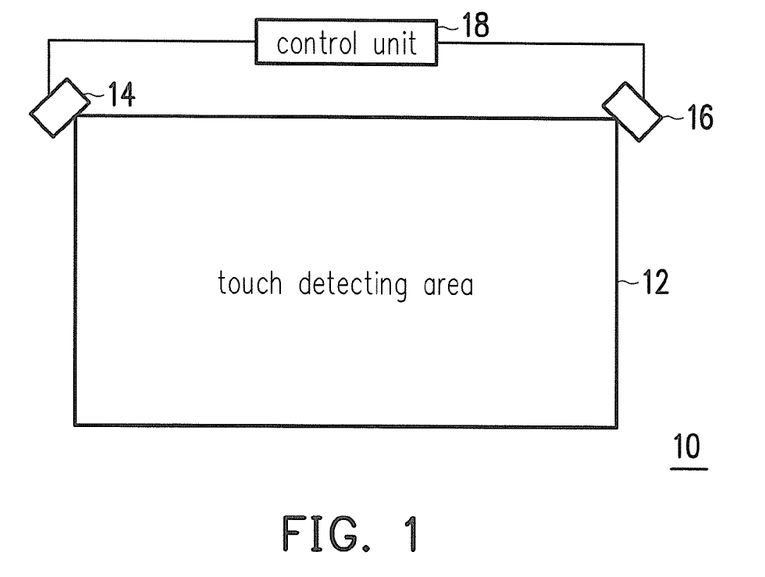
FIG. 1 is a block diagram illustrating an optical touch system according to an embodiment of the invention.

FIG. 1 is a block diagram illustrating an optical touch system according to an embodiment of the invention. Referring to FIG. 1, an optical touch system 10 is an optical touch monitor (OTM), for example. The optical touch system 10 may be disposed on an electronic apparatus, such as a computer screen, TV, electronic whiteboard, etc., to detect a touch object in a touch detecting area 12. In the optical touch system 10, a display, such as liquid crystal display (LCD), light-emitting diode (LED) display, or field emission display (FED), may be disposed in the touch detecting area 12 to display a variety of operation images of the optical touch system 10.

The optical touch system 10 includes a first lens 14, a second lens 16, and a control unit 18. The first lens 14 and the second lens 16 may be optical lenses for capturing an image with a light sensing element, such as charge coupled device (CCD) or complementary metal oxide semiconductor (CMOS), etc. The first lens 14 and the second lens 16 may be disposed at the same side of the touch detecting area 12 (e.g., left and right corners at an upper side) and toward another side of the touch detecting area 12 (e.g., facing diagonal corners at a lower side) to capture images of the touch objects operating in the touch detecting area 12.

The control unit 18 is a central processing unit (CPU), a microprocessor, a digital signal processor (DSP), application specific integrated circuits (ASIC), or other similar devices, for example. The control unit 18 is respectively coupled to the first lens 14 and the second lens 16 and is configured to obtain and analyze the images captured by the first lens 14 and the second lens 16 to calculate the location of the touch object in the touch detecting area 12 accordingly.

Figure 2:
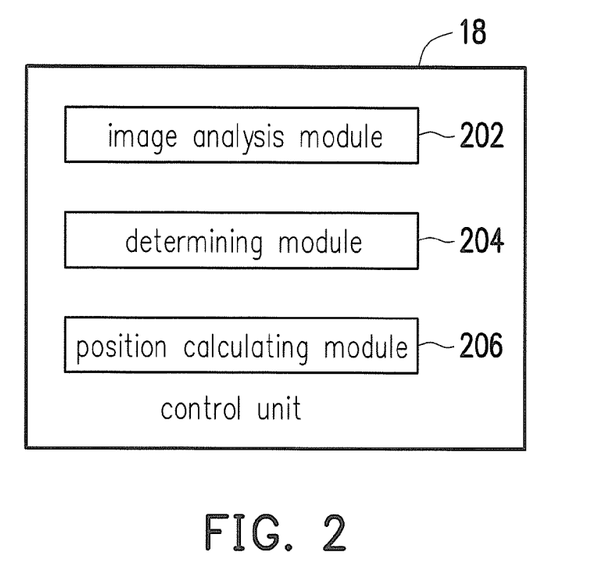
FIG. 2 is a block diagram illustrating a control unit according to an embodiment of the invention.
Figure 3:
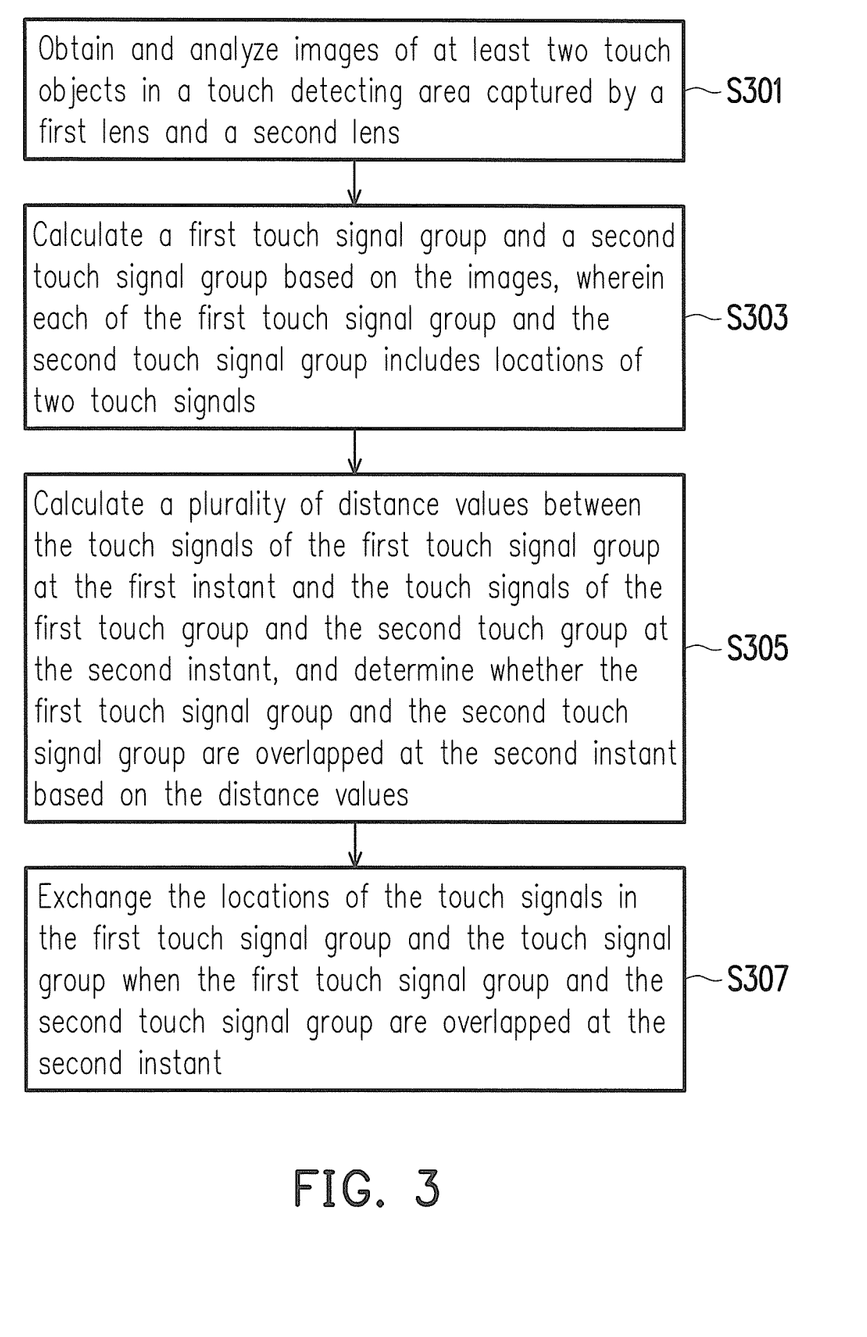
FIG. 3 is a flowchart illustrating a touch point sensing method according to an embodiment of the invention.

FIG. 2 is a block diagram illustrating a control unit according to an embodiment of the invention. FIG. 3 is a flowchart illustrating a touch point sensing method according to an embodiment of the invention. FIGS. 4A to 4E are examples of a touch point sensing method according to an embodiment of the invention. The touch point sensing method of this embodiment is suitable for the optical touch system 10 of FIG. 1. Also, based on respective functions, the control unit 18 of FIG. 1 is further divided into an image analysis module 202, a determining module 204, and a location calculating module 206.

Figure 4A:
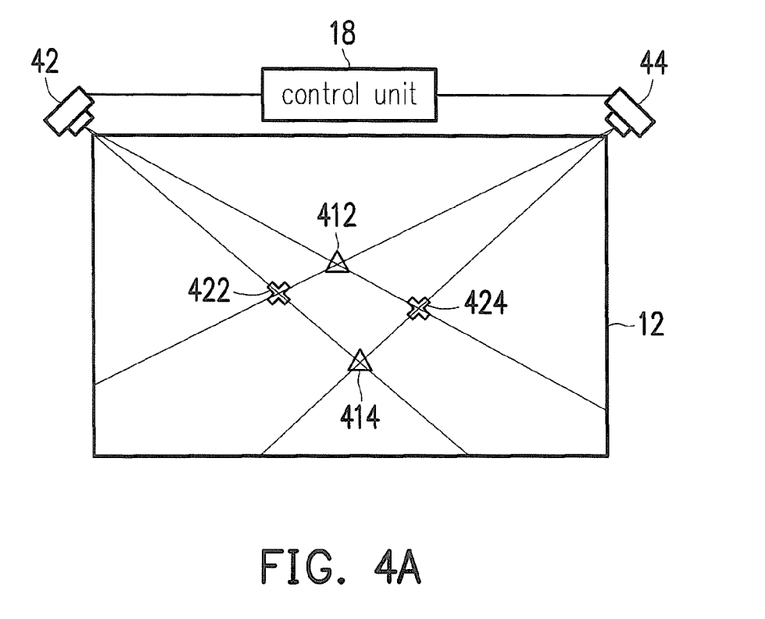
FIGS. 4A to 4E are views illustrating examples of an optical touch system according to an embodiment of the invention sensing touch points.

Referring to FIGS. 2, 3, and 4A at the same time, at Step S301, the image analysis module 202 obtains images of two touch objects in the touch detecting area 12 captured by a first lens 42 and a second lens 44, and analyzes the images to obtain touch signals 412, 414, 422, and 424. Here, the touch objects may be the user's finger or other objects such as a touch pen. The invention is not limited to the types of the touch object.

Figure 4B:
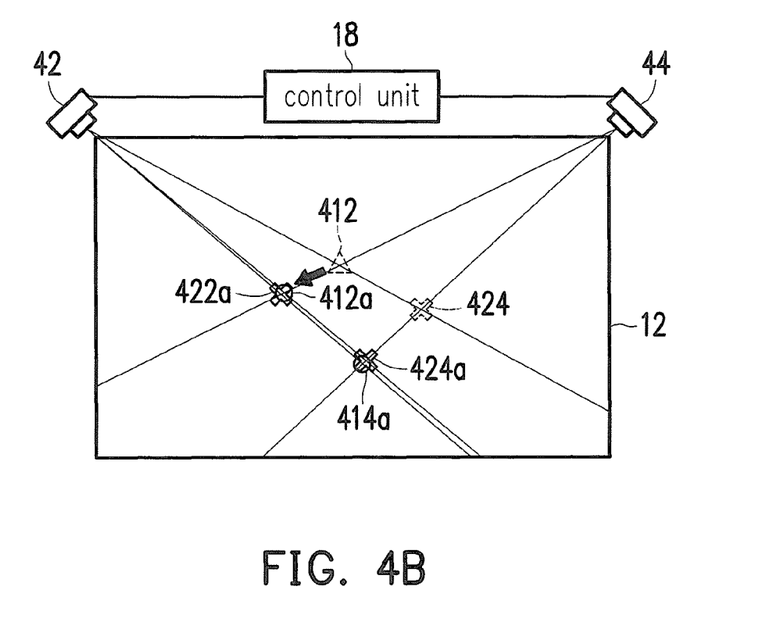

At Step S303, the determining module 204 calculates touch signals and locations included in a first touch signal group and a second touch signal group at instants t1 and t2 according to the captured images. In addition, the instant t1 is prior to the instant t2. Specifically, the determining module 204 categorizes the touch signals 412, 414, 422, and 424 into the two touch signal groups. In this embodiment, the touch signals 412 and 414 on a diagonal are set to be the first touch signal group (indicated with triangle icons in FIG. 4A), and the touch signals 422 and 424 on another diagonal are set to be the second touch signal group (indicated with cross icons in FIG. 4A). Referring to FIG. 4B, in this embodiment, at the instant t1, the first touch signal group includes touch signals 412 and 414, and the second touch signal group includes the touch signals 422 and 424. At the instant t2, since the touch objects move and the locations of the touch objects change, the first touch signal group includes touch signals 412a and 414a (indicated with circle icons) instead and the second touch signal group includes touch signals 422a and 424a (indicated with cross icons) instead. In addition, the touch signal 412a of the first touch signal group is overlapped with the touch signal 422a of the second touch signal group, and the touch signal 414a of the first touch signal group is overlapped with the touch signal 424a of the second touch signal group. The term "overlap" here indicates that at the instant t2, after movement of the touch objects, the first touch signal group and the second touch signal group are so close that the two signal groups are crossover, making the first lens 42 and the second lens 44 unable to obtain separate touch signals of the first touch signal group and the second touch signal group. Under such circumstance, the first lens 42 only obtains a greater touch signal including the touch signals 412a, 422a, 414a, and 424a combined together. Even though the second lens 44 are able to capture two touch signals, one of the signals includes the touch signal 412a and the touch signal 422a, and the other touch signal includes the touch signal 414a and the touch signal 424a. Thus, it is difficult for the optical touch system 10 to determine which of the two touch signal groups indicates a real point and which indicates a ghost point.

Back to Step S305 in FIG. 3, the location calculating module 206 may calculate a plurality of distance values based on the touch signals 412 and 414 of the first touch signal group at the instant t1, the touch signals 412a and the touch signal 414a of the first touch signal group at the instant t2, and the touch signal 422a and the touch signal 424a of the second touch signal group at the instant t2, and determine whether the first touch signal group and the second touch signal group are overlapped at the instant t2 according to the distance values.

More specifically, in an embodiment, whether the first touch signal group and the second touch signal group are overlapped at the instant t2 is determined on the basis of the distance values of the first touch signal group and the second touch signal group at the two instants. Specifically, the distance value may refer to a distant ratio of the touch signals at the two instants. In other words, the distance ratio may be represented by formula (1) in the following:

$$R = \frac{(D11+D12)+(D21+D22)}{\min((D11+D12),(D21+D22))} \quad (1)$$

In formula (1), R is a distance ratio, D11 is a distance from the touch signal 412 at the instant t1 to the touch signal 412a at the instant t2, D12 is a distance from the touch signal 414 at the instant t1 to the touch signal 414a at the instant t2, D21 is a distance from the touch signal 412 at the instant t1 to the touch signal 422a at the instant t2, and D22 is a distance from the touch signal 414 at the instant t1 to the touch signal 424a at the instant t2.

The distance ratio R is calculated based on the touch signals in the first and second touch signal groups at the instants t1 and t2 in the following way: respectively calculating a sum of distances (D11+D12) of the first touch signal group and a sum of distances (D21+D22) of the second touch signal group, adding the sums of distances, and dividing the sum of the sums of distances with a minimum value of the sums of distances to obtain the distance ratio R.

Figure 4C:
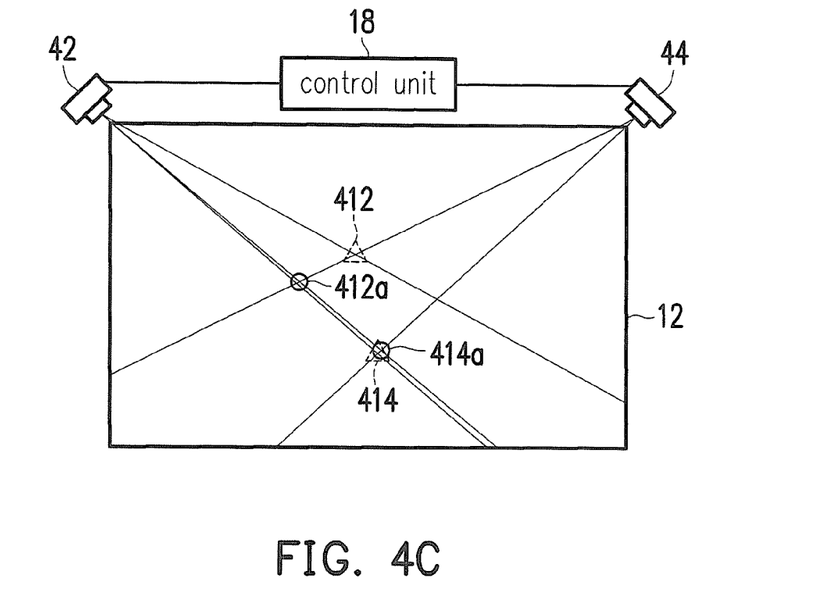

Referring to FIG. 4C, changes of the first touch signal group at the two instants are used to describe how the sum of distances of the first touch signal group is calculated. For the ease of illustration, the second touch signal group is not shown in FIG. 4C. The relation between the second touch signal group and other signals will be described in FIG. 4D and relevant paragraphs. First of all, the first touch signal group at the instant t1 includes the touch signal 412 and the touch signal 414. When the touch objects move, the first touch signal group detected at the instant t2 is the touch signal 412a and the touch signal 414a. The touch signal 414 does not move, so the touch signal 414a at the instant t2 is the same as the touch signal 414 at the instant t1. Then, the location calculating module 206 calculates the distance (D11) between the touch signal 412 at the instant t1 and the touch signal 412a at the instant t2, calculates the distance (D12) between the touch signal 414 at the instant t1 and the touch signal 414a at the instant t2, and adds up the distances to obtain the sum of distances (D11+D12) of the first touch signal group.

Figure 4D:
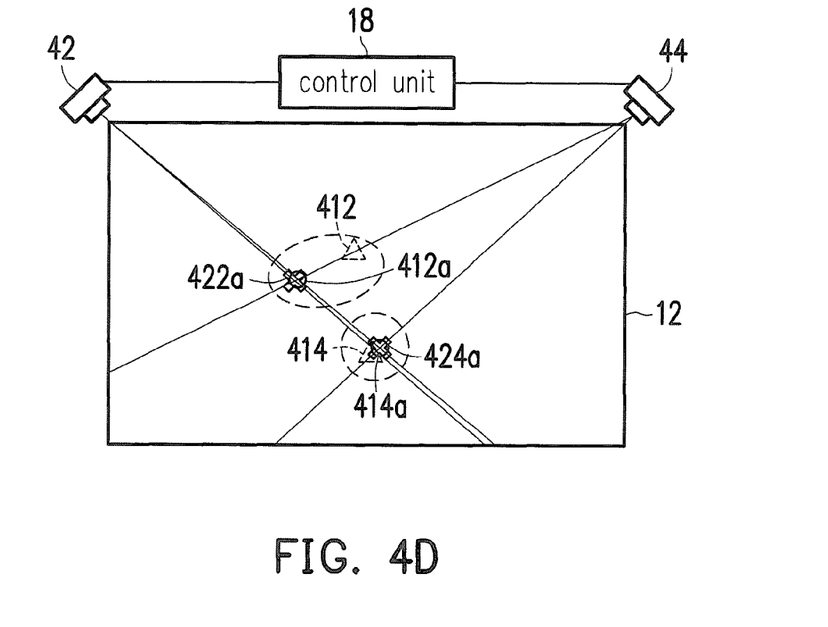
Figure 4E:
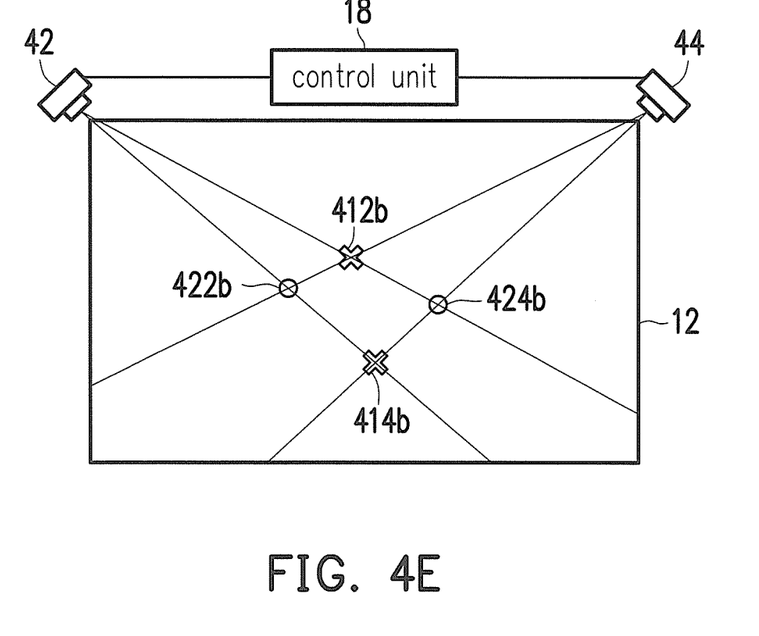

In the following, calculation of the distance ratio R is described with reference to changes of the second touch signal group at the two instants and FIG. 4D. Here, the second touch signal group at the instant t1 includes the touch signal 422 and the touch signal 424, and the second touch signal group at the instant t2 includes the touch signal 422a and the touch signal 424a. In the same way, the sum of distances of the second touch signal group may be obtained by calculating the distance between the first touch signal group at the instant t1 and the distance of the second touch signal group at the instant t2. Thus, it can be known that the sum of distances of the second touch signal group is the sum (D21+D22) of the distance (D21) between the touch signal 412 at the instant t1 and the touch signal 422a at the instant t2 and the distance (D22) between the touch signal 414 at the instant t1 and the touch signal 424a at the instant t2.

In another embodiment of the invention, whether the first touch signal group is overlapped with the second touch signal group may be determined according to a minimal distance between the respective touch signals at the respective time points. For example, by adding up a distance between the touch signal 412 at the instant t1 and the touch signal 414a at the instant t2 and a distance between the touch signal 414 at the instant t1 and the touch signal a412a t the instant t2, another sum of distances of the first touch signal group is obtained. Also, by adding a distance between the touch signal 412 at the instant t1 and the touch signal 424a at the instant t2 and a distance between the touch signal 414 at the instant t1 and the touch signal 422a at the instant t2, another sum of distances of the second touch signal group is obtained. Thus, in another embodiment, the sum of distances of the first touch signal group may be a minimum value of the two sums of distances of the first touch signal group calculated based on the methods described above. Similarly, a minimum value of the two sums of distances of the second touch signal groups obtained based on the methods described above serves as the sum of distance of the second touch signal group.

Then, after the sum of distances of the first touch signal group and the sum of distances of the second touch signal group are respectively calculated, the location calculating module 206 adds up the sum of distances (D11+D12) of the first touch signal group and the sum of distances (D21+D22) of the second touch signal group. Then, the sum of the sums of distances is divided by a smaller value of the two sums of distances, so as to obtain the distance ratio R of the touch signals at the instants t1 and t2.

Specifically, the sum of distances of the first touch signal group is obtained by adding up the distance (D11) between the touch signal 412 and the touch signal 412a and the distance (D12) between the touch signal 414 and the touch signal 414a, and the sum of distances of the second touch signal group is obtained by adding up the distance (D21) between the touch signal 412 and the touch signal 422a and the distance (D22) between the touch signal 414 and the touch signal 424a. Therefore, when the touch signal 412a is overlapped with the touch signal 422a and the touch signal 414a is overlapped with the touch signal 424a, the distance between the touch signal 412 and the touch signal 412a is the same as the distance between the touch signal 412 and the touch signal 422a (D11=D21), and the distance between the touch signal 414 and the touch signal 414a is the same as the touch signal 414 and the touch signal 424a (D12=D22). In other words, the sum of distances of the first touch signal group is the same as the sum of distances of the second touch signal group, i.e., (D11+D12)=(D21+D22). Thus, the distance ratio R obtained by adding up the sums of distances and then dividing the sum of the sums of distances with the minimum value of the sums of distances is 2. In other words, the determining module 204 may determine that if the ratio value between the sum of the sum of distances of the first touch signal group and the sum of distances of the second touch signal group and the smaller one of the two sums of distances is within a predetermined range (e.g., 2), the first touch signal group and the second touch signal group at the instant t2 are overlapped.

It should be noted that the distance ratio R varies as the touch objects move. When the two touch objects move from their original locations to make the two touch signal groups gradually overlap each other, the distance ratio R may gradually decrease from a value greater than 2. When the two touch signal groups are completely overlapped, the distance ratio R is 2. However, when the objects start moving, and the two touch signal groups are no longer overlapped and are gradually crossing each other, the distance ratio R gradually increases and becomes greater than 2. By using this characteristic, real touch points are determined, and ghost points are excluded.

Therefore, in another embodiment, the location calculating module 206 may compare the distance ratio R of the two touch signal groups between a current instant and a previous instant. Under a circumstance that the two touch signal groups are approaching each other, if the distance ratio R calculated at the previous instant is greater than the distance ratio R calculated at the current instant, the first touch signal group and the second touch signal group are not overlapped yet. On the contrary, if the distance ratio R at the previous instant is smaller than the distance ratio R at the current instant, the first touch signal group and the second touch signal group are already overlapped or are being overlapped to each other. For example, regarding the instants t1, t2, and an instant t3, the calculating module 206 may calculate a distance ratio $R_{t1,t2}$ of the touch signals between the instant t1 and the instant t2, and a distance ratio $R_{t2,t3}$ of the touch signals between the instant t2 and the instant t3, respectively. Here, the two touch signal groups are approaching each other before the instant t1. The instant t1 is prior to the instant t2, and the instant t2 is prior to the instant t3. Then, when the determining module 204 determines that the distance ratio $R_{t1,t2}$ between the instant t1 and the instant t2 is smaller than the distance ratio $R_{t2,t3}$ between the instant t2 and the instant t3, it is indicated that the first touch signal group and the second touch signal group are already overlapped at the instant t2, and the first touch signal group and the second touch signal group already cross each other at the instant t3.

Back to Step S307 in FIG. 3, when the determining module 204 determines that the first and second touch signal groups are already overlapped at the instant t2, the location calculating module 206 may exchange the location of each of the touch signals in the first and second touch signal groups. For example, referring to FIG. 4E, when it is determined that the first and second touch signal groups are already overlapped, the first touch signal group then includes the touch signals 422b and 424b, while the second touch signal group includes the touch signals 412b and 414b. Thus, the locations of the touch points after movement of the touch objects are able to be correctly distinguished, so as to avoid misjudging the ghost point as the correct touch point.

In view of the foregoing, in the invention, the sensed images of the at least two touch objects are analyzed to obtain the touch signals, and the touch signals are categorized into two touch signal groups. By calculating the distance values between the first touch signal group at the previous instant and the first touch signal group at the current instant and the distance value between the first touch signal group at the previous instant and the second touch signal group at the current instant to calculate the ratio value, whether the two touch signal groups are overlapped is determined based on the ratio value. Moreover, in the invention, whether the two touch signal groups are overlapped between two instants may be determined based on the change between the ratio value calculated based on the two touch signal groups at the previous instant and the ratio value between the two touch signal groups at the current instant. When the two touch signal groups are overlapped, the two touch signal groups are exchanged, so as to correctly reflect the locations of the correct touch points, thereby effectively sensing the touch points.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A touch point sensing method, adapted to an optical touch system having a first lens and a second lens, the touch point sensing method comprising steps as follows:

obtaining and analyzing images of at least two touch objects in a touch detecting area captured by the first lens and the second lens;

calculating a first touch signal group and a second touch signal group at a first instant and a second instant according to the images, wherein each of the first touch signal group and the second touch signal group comprises locations of two touch signals;

calculating a plurality of distance values between the touch signals in the first touch signal group at the first instant and the touch signals in the first touch signal group and the second touch signal group at the second instant, and determining whether the first touch signal group and the second touch signal group are overlapped at the second instant based on the distance values; and when the first touch signal group and the second touch signal group are overlapped at the second instant, exchanging the locations of the touch signals in the first touch signal group and the second touch signal group.

2. The touch point sensing method as claimed in claim 1, wherein the step of calculating the distance values between the touch signals in the first touch signal group at the first instant and the touch signals in the first touch signal group and the second touch signal group at the second instant, and determining whether the first touch signal group and the second touch signal group are overlapped at the second instant based on the distance values further comprises:
calculating a first sum of distances of the distance values between the touch signals in the first touch signal group at the first instant and the touch signals in the first touch signal group at the second instant;
calculating a second sum of distances of the distance values between the touch signals in the first touch signal group at the first instant and the touch signals in the second touch signal group at the second instant;
when a ratio value between a sum of the first and second sums of distances and a smaller one of the first and second sums of distances is within a predetermined range, determining that the first touch signal group is overlapped with the second touch signal group.

3. The touch point sensing method as claimed in claim 2, wherein the step of determining whether the first touch signal group and the second touch signal group are overlapped at the second instant based on the distance values further comprises:
when a ratio value between the distance values calculated at the first instant and the second instant is less than the ratio value between the distance values calculated at the second instant and a third instant, determining that the first touch signal group is overlapped with the second touch signal group, wherein the first instant is prior to the second instant, and the second instant is prior to the third instant.

4. The touch point sensing method as claimed in claim 1, wherein the step of calculating the distance values between the touch signals in the first touch signal group at the first instant and the touch signals in the first touch signal group and the second touch signal group at the second instant, and determining whether the first touch signal group and the second touch signal group are overlapped at the second instant based on the distance values further comprises:
calculating a first minimum distance value of the distance values between combinations of the distance values between the touch signals in the first touch signal group at the first instant and the touch signals in the first touch signal group at the second instant;
calculating a second minimum distance value of the distance values between combinations of the distance values between the touch signals in the first touch signal group at the first instant and the touch signals in the second touch signal group at the second instant;
when a ratio value between a sum of distances of the first minimum distance value and the second minimum distance value and a smaller one of the first minimum distance value and the second minimum distance value is within a predetermined range, determining that the first touch signal group is overlapped with the second touch signal group.

5. The touch point sensing method as claimed in claim 1, wherein the step of determining whether the first touch signal group and the second touch signal group are overlapped at the second instant based on the distance values further comprises:
not exchanging the locations of the touch signals in the first touch signal group and the second touch signal group when the first touch signal group and the second touch signal group are not overlapped at the second instant.

6. The touch point sensing method as claimed in claim 1, wherein the first lens and the second lens are disposed at the same side of the touch detecting area and toward another side of the touch detecting area.

7. An optical touch system, comprising:
a first lens and a second lens, configured to capture images of at least two touch objects in a touch detecting area; and
a processor, coupled to the first lens and the second lens, configured to obtain and analyze the images of the at least two touch objects in the touch detecting area captured by the first lens and the second lens, and calculating a first touch signal group and a second touch signal group at a first instant and a second instant, wherein each of the first touch signal group and the second touch signal group comprises locations of two touch signals, a plurality of distance values between the touch signals in the first touch signal group at the first instant and the touch signals in the first touch signal group and the second touch signal group at the second instant are calculated, whether the first touch signal group and the second touch signal group are overlapped at the second instant is determined based on the distance values, and the locations of the touch signals in the first touch signal group and the second touch signal group are exchanged when the first touch signal group and the second touch signal group are overlapped at the second instant.

8. The optical touch system as claimed in claim 7, wherein the processor calculates a first sum of distances of the distance values between the touch signals in the first touch signal group at the first instant and the touch signals in the first touch signal group at the second instant, calculates a second sum of distances of the distance values between the touch signals in the first touch signal group at the first instant and the touch signals in the second touch signal group at the second instant, and determines that the first touch signal group is overlapped with the second touch signal group when a ratio value between a sum of the first sum of distances and the second sum of distances and a smaller one of the first sum of distances and the second sum of distances is within a predetermined range.

9. The optical touch system as claimed in claim 8, wherein when the processor determines that a ratio value between the distance values calculated at the first instant and the second instant is less than the ratio value between the distance values calculated at the second instant and a third instant, the processor determines that the first touch signal group is overlapped with the second touch signal group, wherein the first instant is prior to the second instant, and the second instant is prior to the third instant.

10. The optical touch system as claimed in claim 7, wherein the processor calculates a first minimum distance value of the distance values between combinations of the distance values between of the touch signals in the first touch signal group at the first instant and the touch signals in the first touch signal group at the second instant, calculates a second minimum distance value of the distance values between combinations of the distance values between touch signals in the first touch signal group at the first instant and the touch signals in the second touch signal group at the second instant, and determines that the first touch signal group is overlapped with the second touch signal group when a ratio value between a sum of distances of the first minimum distance value and the second minimum distance value and a smaller one of the first minimum distance value and the second minimum distance value is within a predetermined range.

11. The optical touch system as claimed in claim 7, wherein the processor determines not to exchange the locations of the touch signals in the first touch signal group and the second touch signal group when the first touch signal group and the second touch signal group are not overlapped at the second instant.

12. The optical touch system as claimed in claim 7, wherein the first lens and the second lens are disposed at the same side of the touch detecting area and toward another side of the touch detecting area.

* * * * *